(12) United States Patent
Yoshimi

(10) Patent No.: US 8,578,298 B2
(45) Date of Patent: Nov. 5, 2013

(54) DISPLAY CONTROL APPARATUS AND CONTROL METHOD THEREOF

(75) Inventor: Takashi Yoshimi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 12/899,173

(22) Filed: Oct. 6, 2010

(65) Prior Publication Data

US 2011/0113387 A1    May 12, 2011

(30) Foreign Application Priority Data

Nov. 12, 2009   (JP) ................................. 2009-259308

(51) Int. Cl.
   *G06F 3/048*   (2013.01)
(52) U.S. Cl.
   USPC ........................................................ 715/846
(58) Field of Classification Search
   USPC ......... 715/856, 764, 863, 246, 252, 725, 800, 715/815, 864
   See application file for complete search history.

(56) References Cited

U.S. PATENT DOCUMENTS

| | | | |
|---|---|---|---|
| 2002/0118227 A1* | 8/2002 | Salvatore | 345/764 |
| 2003/0001869 A1* | 1/2003 | Nissen | 345/672 |
| 2007/0180400 A1* | 8/2007 | Zotov et al. | 715/788 |

FOREIGN PATENT DOCUMENTS

| | | |
|---|---|---|
| JP | 06-103013 | 4/1994 |
| JP | 07-098769 A | 4/1995 |
| JP | 08-137620 A | 5/1996 |

OTHER PUBLICATIONS

The above foreign patent documents 1 and 2 were cited in a Jul. 5, 2013 Japanese Office Action, which is enclosed without an English Translation, that issued in Japanese Patent Application No. 2009-259308.

* cited by examiner

*Primary Examiner* — Alexander S Beck
*Assistant Examiner* — Sejoon Ahn
(74) *Attorney, Agent, or Firm* — Cowan, Liebowitz & Latman, P.C.

(57) ABSTRACT

There is provided a display control apparatus comprising: an input unit configured to designate a position on a display screen; a display control unit configured to control to identifiably display a set region set on the display screen; and a control unit configured to control to, when a trajectory of the designated position after a start of designating the position by the input unit does not satisfy a predetermined condition while the set region is set on the display screen, change a portion occupied by the set region on the display screen in accordance with the trajectory, and when the trajectory satisfies the predetermined condition, set a new set region different from the set region on the display screen in accordance with the trajectory.

39 Claims, 7 Drawing Sheets

DISPLAY CONTROL APPARATUS AND CONTROL METHOD THEREOF

BACKGROUND OF THE INVENTION

1. Field of the Invention

The present invention relates to a display control apparatus and control method thereof.

2. Description of the Related Art

Some display control apparatus for a personal computer (PC) and the like can set a region on the display screen of the display in accordance with an instruction from an input device such as a pointing device (PD). The set region is used as a processing target subjected to subsequent processing. For example, when a region containing part of an image to be edited is set while the PC executes an image editing application, an image within the region undergoes image processing such as trimming processing.

The region is set by a manipulation of, for example, selecting a start point on the display screen by the user of the display control apparatus with the PD, and moving the pointer from the start point to the end point. In this case, the set region is, for example, a rectangle whose diagonal is defined by the start and end points.

After setting the region, the user may sometimes wants to perform adjustments such as enlargement, reduction, and movement of a region. As a technique regarding a PD manipulation for these adjustments, there is known Japanese Patent Laid-Open No. 6-103013 that discloses a technique concerning enlargement, reduction, and movement of a window. In Japanese Patent Laid-Open No. 6-103013, enlargement of a window or the like is executed by, for example, moving the pointer to contact or cross the boundary of the window. This facilitates the manipulation because the user need not position the pointer to the narrow region of the boundary such as the frame or corner of the window.

In another case, the user may want to delete a set region and set a new region, instead of executing the foregoing adjustment. However, when the technique in Japanese Patent Laid-Open No. 6-103013 is adopted, even if the user designates a position other than a set region with the PD, the set region is adjusted. Hence, before performing the manipulation for setting a region, the user needs to execute any additional manipulation (for example, a manipulation of selecting a set region and pressing a region delete button displayed on the display screen). This additional manipulation increases the manipulation burden on the user.

SUMMARY OF THE INVENTION

The present invention has been made in consideration of the above situation, and reduces, with good balance, a manipulation burden for adjusting a region set on the display screen, and a manipulation burden for setting a new region.

According to an aspect of the present invention, there is provided a display control apparatus comprising: an input unit configured to designate a position on a display screen; a display control unit configured to control to identifiably display a set region set on the display screen; and a control unit configured to control to, when a trajectory of the designated position after a start of designating the position by the input unit does not satisfy a predetermined condition while the set region is set on the display screen, change a portion occupied by the set region on the display screen in accordance with the trajectory, and when the trajectory satisfies the predetermined condition, set a new set region different from the set region on the display screen in accordance with the trajectory.

According to another aspect of the present invention, there is provided a method of controlling a display control apparatus having an input unit configured to designate a position on a display screen, the method comprising: a display control step of controlling to identifiably display a set region set on the display screen; and a control step of controlling to, when a trajectory of the designated position after a start of designating the position by the input unit does not satisfy a predetermined condition while the set region is set on the display screen, change a portion occupied by the set region on the display screen in accordance with the trajectory, and when the trajectory satisfies the predetermined condition, set a new set region different from the set region on the display screen in accordance with the trajectory.

With the above arrangement, the present invention can reduce, with good balance, a manipulation burden for adjusting a region set on the display screen, and a manipulation burden for setting a new region.

Further features of the present invention will become apparent from the following description of exemplary embodiments with reference to the attached drawings.

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

Hereinafter, an embodiment in which a display control apparatus according to the present invention is applied to a personal computer (PC) will be described. In the following embodiment, the PC uses a touch panel as a pointing device (PD). However, the PD is not limited to this, and the PC may use a mouse or the like.

[First Embodiment]

Figure 1:
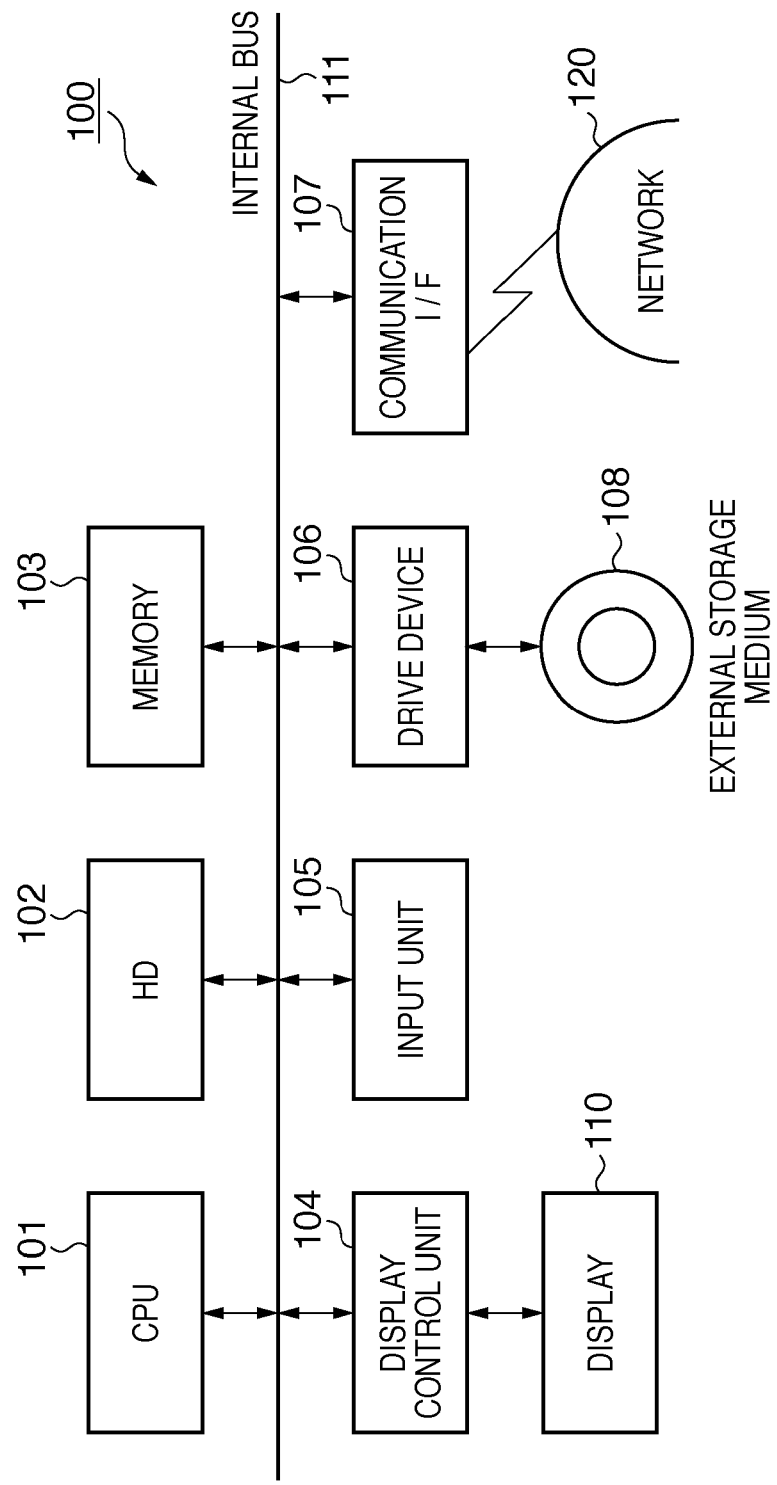
FIG. 1 is a block diagram exemplifying the arrangement of a personal computer (PC) 100 according to the first embodiment.

FIG. 1 is a block diagram exemplifying the arrangement of a PC 100 according to the first embodiment. In FIG. 1, a CPU 101, hard disk (HD) 102, memory 103, display control unit 104, and input unit 105 are connected to an internal bus 111. A drive device 106 and communication interface (I/F) 107 are also connected to the internal bus 111. The respective units connected to the internal bus 111 are configured to be able to exchange data via the internal bus 111.

The HD 102 stores image data, other data, various programs for operating the CPU 101, and the like. The memory 103 includes, for example, a RAM. The CPU 101 controls each unit of the PC 100 using the memory 103 as a work memory in accordance with, for example, a program stored in the HD 102. Note that the program for operating the CPU 101 is not limited to one stored in the HD 102, and may be stored in advance in, for example, a ROM (not shown).

The input unit 105 accepts a user manipulation, generates a control signal corresponding to the manipulation, and supplies it to the CPU 101. For example, as input devices for accepting a user manipulation, the input unit 105 includes a text information input device such as a keyboard, and a pointing device such as a mouse or touch panel. Note that the touch panel is an input device which outputs coordinate information corresponding to a position where the user touches, for example, a flat input unit. The CPU 101 controls each unit of the PC 100 according to a program, based on a control signal which is generated and supplied by the input unit 105 in accordance with a user manipulation to the input device. The CPU 101 can, therefore, control the PC 100 to perform an operation complying with the user manipulation.

The display control unit 104 outputs a display signal to display an image on the display screen of a display 110 (display device). For example, the CPU 101 supplies, to the display control unit 104, a display control signal generated according to a program. Based on the display control signal, the display control unit 104 generates a display signal and outputs it to the display 110. For example, based on the display control signal generated by the CPU 101, the display control unit 104 controls the display 110 to display a GUI screen which forms a GUI (Graphical User Interface).

Note that the touch panel of the input unit 105 can be integrated with the display 110. For example, a touch panel configured not to interfere with display on the display 110 owing to the light transmittance is attached to the upper layer of the display surface of the display 110. Then, an input coordinate point on the touch panel is made to correspond to a display coordinate on the display 110. Accordingly, a GUI with which the user manipulates a screen displayed on the display 110 as if he could directly manipulate it can be configured.

The drive device 106 allows mounting an external storage medium 108 such as a CD or DVD. Under the control of the CPU 101, the drive device 106 performs readout of data from the mounted external storage medium 108, write of data on the external storage medium 108, and the like. Note that the external storage medium 108 mountable in the drive device 106 is not limited to a disk storage medium such as a CD or DVD. A nonvolatile semiconductor memory such as a memory card may be mounted in the drive device 106. The communication I/F 107 communicates with a network 120 such as a LAN or the Internet under the control of the CPU 101.

The CPU 101 (selection control means) can detect the following manipulations (instructions) to the touch panel: touching the touch panel with a finger or pen (called Touch Down), keeping touching the touch panel with a finger or pen (called Touch On), moving a finger or pen on the touch panel while touching the touch panel with it (called Move), removing, from the touch panel, a finger or pen which has touched the touch panel (called Touch Up), and not touching the touch panel (called Touch Off). In these manipulations, the CPU 101 is notified via the internal bus 111 of the coordinate point of a position where the finger or pen touches the touch panel. Based on the notified information, the CPU 101 determines a manipulation which has been performed on the touch panel.

As for Move, even the moving direction of a finger or pen which moves on the touch panel can be determined for each of vertical and horizontal components on the touch panel, based on a change of the coordinate point of the position. It is assumed that the finger or pen draws a stroke, if the finger or pen touches up after it touches down on the touch panel and moves by a predetermined distance. A manipulation of quickly drawing a stroke will be called Flick. Flick is a manipulation of quickly moving a finger by only a predetermined distance while keeping touching the touch panel, and then removing it. In other words, Flick is a manipulation of quickly touching the touch panel as if the finger flicked it. If Move by a predetermined distance or more at a predetermined speed or more is detected, and Touch Up is detected subsequently, it can be determined that Flick was done. When Move by the predetermined distance or more at lower than the predetermined speed is detected, it is determined that Drag was done.

Figure 2:
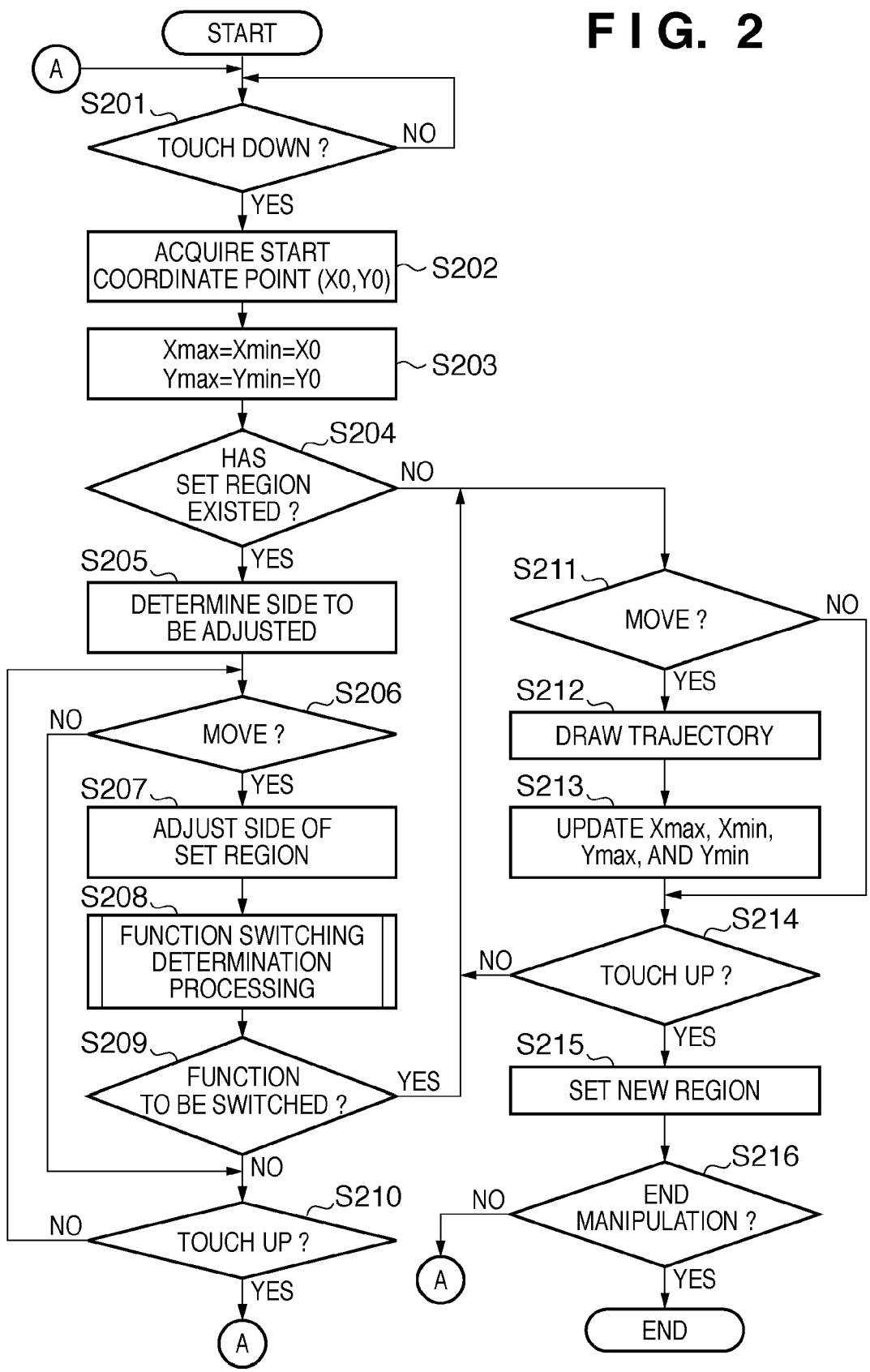
FIG. 2 is a flowchart showing the sequence of region setting processing and region adjustment processing according to the first embodiment.

FIG. 2 is a flowchart showing the sequence of region setting processing and region adjustment processing according to the first embodiment. The region setting processing is to set a region of a predetermined size on the display screen. The region setting processing is performed to, for example, determine a trimming region when trimming an image, render a rectangle by graphic software or the like, or set a window for performing specific work on the display 110. The region adjustment processing is to apply a manipulation such as enlargement, reduction, movement, or rotation to a set region (in other words, a manipulation of changing a portion occupied by the region on the display screen).

The CPU 101 implements processing shown in the flowchart of FIG. 2 by executing a program stored in the HD 102 using the memory 103 as a work memory. As will be described with reference to FIG. 2, in the first embodiment, region adjustment processing is automatically switched to region setting processing in accordance with the trajectory of Move on the touch panel. When the user switches the operation mode of the PC 100 to the region manipulation mode via the input unit 105, the process of the flowchart starts.

In step S201, the CPU 101 determines whether Touch Down to the touch panel has been done. If no Touch Down has been done, the process waits for Touch Down. If Touch Down has been done, the process advances to step S202.

In step S202, the CPU 101 selects a specific touch position (start position) on the display screen upon detecting Touch Down. The CPU 101 also acquires the coordinate point of the touch position, and stores it as a start coordinate point (X0, Y0) in the memory 103.

In step S203, the CPU 101 sets the start point coordinate X0 as the initial values of the maximum value Xmax and minimum value Xmin of the X-coordinate on the trajectory of Move. Similarly, the CPU 101 sets the start point coordinate Y0 as the initial values of the maximum value Ymax and minimum value Ymin of the Y-coordinate on the trajectory of Move.

In step S204, the CPU 101 determines whether a set region has already existed on the display screen of the display 110. If a set region has already existed, the process advances to step S205 in order to execute region adjustment processing; if no set region has existed, to step S211 in order to execute region setting processing.

Figure 3A:
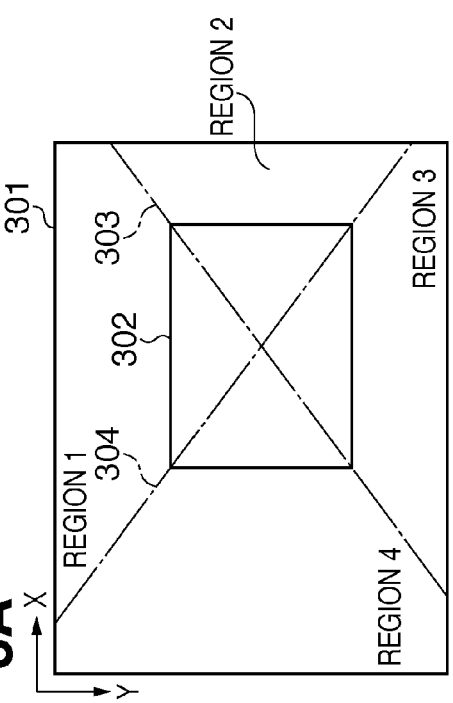
FIGS. 3A to 3D are schematic views of region adjustment processing and function switching determination processing.

In step S205, the CPU 101 determines a side to be adjusted in the set region, based on the touched-down start coordinate point (X0, Y0). A method of determining a side to be adjusted in the set region will be explained with reference to FIG. 3A. In a display region 301 which is the entire display screen of the display 110, assume that the X- and Y-coordinates are positive in directions shown in FIG. 3A using the upper left corner of the display region 301 as the origin. A set region 302 is displayed in the display region 301. In this case, diagonals 303 and 304 of the set region 302 divide the display region 301 into four regions 1 to 4 shown in FIG. 3A. The CPU 101 determines a side to be adjusted in the set region 302 depending on which of regions 1 to 4 contains the start coordinate point (X0, Y0) acquired in step S202 (positional relationship between the set region 302 and the touch position). When region 1 contains the start coordinate point (X0, Y0), the upper side of the set region 302 is determined as a side to be adjusted. When region 2 contains the start coordinate point (X0, Y0), the right side of the set region 302 is determined as a side to be adjusted. When region 3 contains the start coordinate point (X0, Y0), the lower side of the set region 302 is determined as a side to be adjusted. When region 4 contains the start coordinate point (X0, Y0), the left side of the set region 302 is determined as a side to be adjusted. In this way, the user can designate a side to be adjusted, by touching one of the four divided regions of the display region 301 without directly touching the position of the side of the set region 302. Therefore, even when, for example, the display screen of the display 110 is small, the user can quickly, reliably designate a side to be adjusted by a rough manipulation.

In step S206, the CPU 101 determines whether Move has been detected. If Move has been detected, the process advances to step S207; if no Move has been detected, to step S210.

Figure 3B:
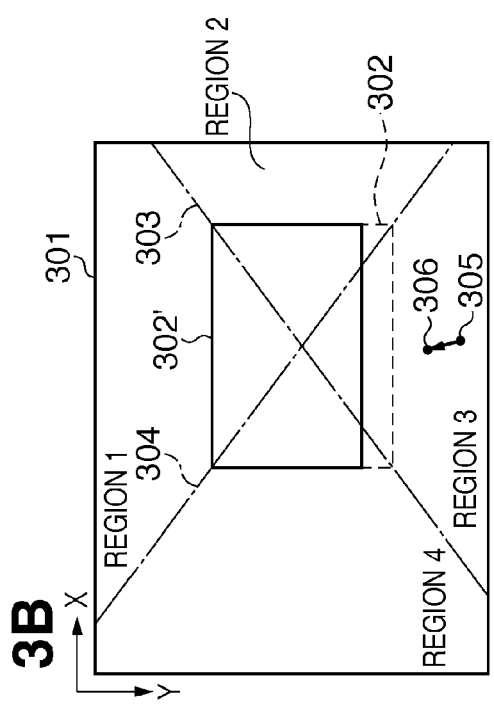

In step S207, the CPU 101 adjusts, in accordance with movement of the touch position in Move (movement of the selected position), the side to be adjusted in the set region 302 that has been determined in step S205. For example, when region 3 contains a start coordinate point 305, the lower side of the set region 302 is adjusted in accordance with Move, as shown in FIG. 3B. In Move, the side position is adjusted depending on the moving amount of a component (Y component) perpendicular to the side (lower side) to be adjusted. For example, if the user moves the touch position from the start coordinate point 305 to an upper coordinate point 306, the lower side (broken-line portion) of the original set region 302 moves up, like an adjusted set region 302' (solid-line portion), as shown in FIG. 3B. Along with the movement of the lower side, the lengths of the left and right sides adjacent to the lower side are also adjusted.

The following three patterns are conceivable regarding setting of the adjustment amount of the side position with respect to the moving amount of a component perpendicular to the side to be adjusted out of the moving amounts of a selected position. When the adjustment amount (moving amount) of the side position is set equal to the moving amount of a component perpendicular to the side to be adjusted out of the moving amounts of a selected position, this implements an intuitive manipulation for the user. When the adjustment amount (moving amount) of the side position is calculated by multiplying, by a predetermined magnification of less than 1, the moving amount of a component perpendicular to the side to be adjusted out of the moving amounts of a selected position, the moving amount of the side becomes smaller than Move by the user and the side can be finely adjusted even by a rough user manipulation. When the adjustment amount (moving amount) of the side position is calculated by multiplying, by a predetermined magnification of more than 1, the moving amount of a component perpendicular to the side to be adjusted out of the moving amounts of a selected position, the moving amount of the side becomes larger than Move by the user and the side can be greatly adjusted even by a slight user manipulation.

In step S208, the CPU 101 performs function switching determination processing to determine whether to end the region adjustment processing in progress and switch to region setting processing. The function switching determination processing includes canceling the setting of a set region when it is determined to switch the function (or processing). Details of the function switching determination processing will be described later with reference to FIGS. 4 to 6.

In step S209, the CPU 101 determines, based on the result of the function switching determination processing in step S208, whether the function (processing) has been switched. If the CPU 101 determines that the function has not been switched, the process advances to step S210. If the CPU 101 determines that the function has been switched, the process advances to step S211.

In step S210, the CPU 101 determines whether Touch Up has been done. If the CPU 101 determines that Touch Up has been done, it cancels the selection of the position (end position) selected at that time, and the process returns to step S201. At this time, the CPU 101 clears the start coordinate point (X0, Y0), the maximum value Xmax and minimum value Xmin of the X-coordinate, and the maximum value Ymax and minimum value Ymin of the Y-coordinate which are stored in the memory 103. If the CPU 101 determines in step S210 that no Touch Up has been done, the process returns to step S206 to continue region adjustment processing corresponding to Move.

Region setting processing starting from step S211 is executed when it is determined in step S204 that no set region has existed or when it is determined in step S208 "to switch to region setting processing". In step S211, the CPU 101 determines whether Move has been detected. If the CPU 101 determines that Move has been detected, the process advances to step S212; if it determines that no Move has been detected, to step S214.

In step S212, the CPU 101 displays a trajectory line corresponding to Move on the display screen of the display 110. In step S213, if a touch position (position selected on the display screen) after movement by Move requires update of the maximum value Xmax and minimum value Xmin of the X-coordinate and the maximum value Ymax and minimum value Ymin of the Y-coordinate in Touch Down, the CPU 101 updates them and stores the updated values in the memory 103.

In step S214, the CPU 101 determines whether Touch Up has been done. If the CPU 101 determines that Touch Up has been done, the process advances to step S215; if it determines that no Touch Up has been done, returns to step S211.

In step S215, the CPU 101 sets a new rectangular region on the display screen of the display 110 based on the trajectory of the touch position. More specifically, the CPU 101 displays, on the display 110, a rectangle whose diagonal has vertices (Xmax, Ymax) and (Xmin, Ymin), and stores, in the memory 103, information which specifies this region. This rectangle circumscribes the trajectory of the touch position. Alternatively, a region defined by a rectangle whose diagonal is determined by the start and end positions may be set. In Touch Up, for example, when the moving distance of Move after Touch Down is too short and only a point or an excessively small rectangle can be set, or when only movement parallel to either the X- or Y-axis is done and only a straight line can be set, no region is set.

In step S216, the CPU 101 determines whether an end manipulation has been performed. The end manipulation includes a manipulation of turning off the PC 100, a manipulation of finalizing a region and executing processing for it, and a manipulation of canceling region setting processing. If the CPU 101 determines that no end manipulation has been performed, the process returns to step S201; if it determines that an end manipulation has been performed, the process of the flowchart ends.

After that, the CPU 101 can execute trimming of an image, enlargement of an image, setting of a window, and the like using the region set in region setting processing.

Figure 4:
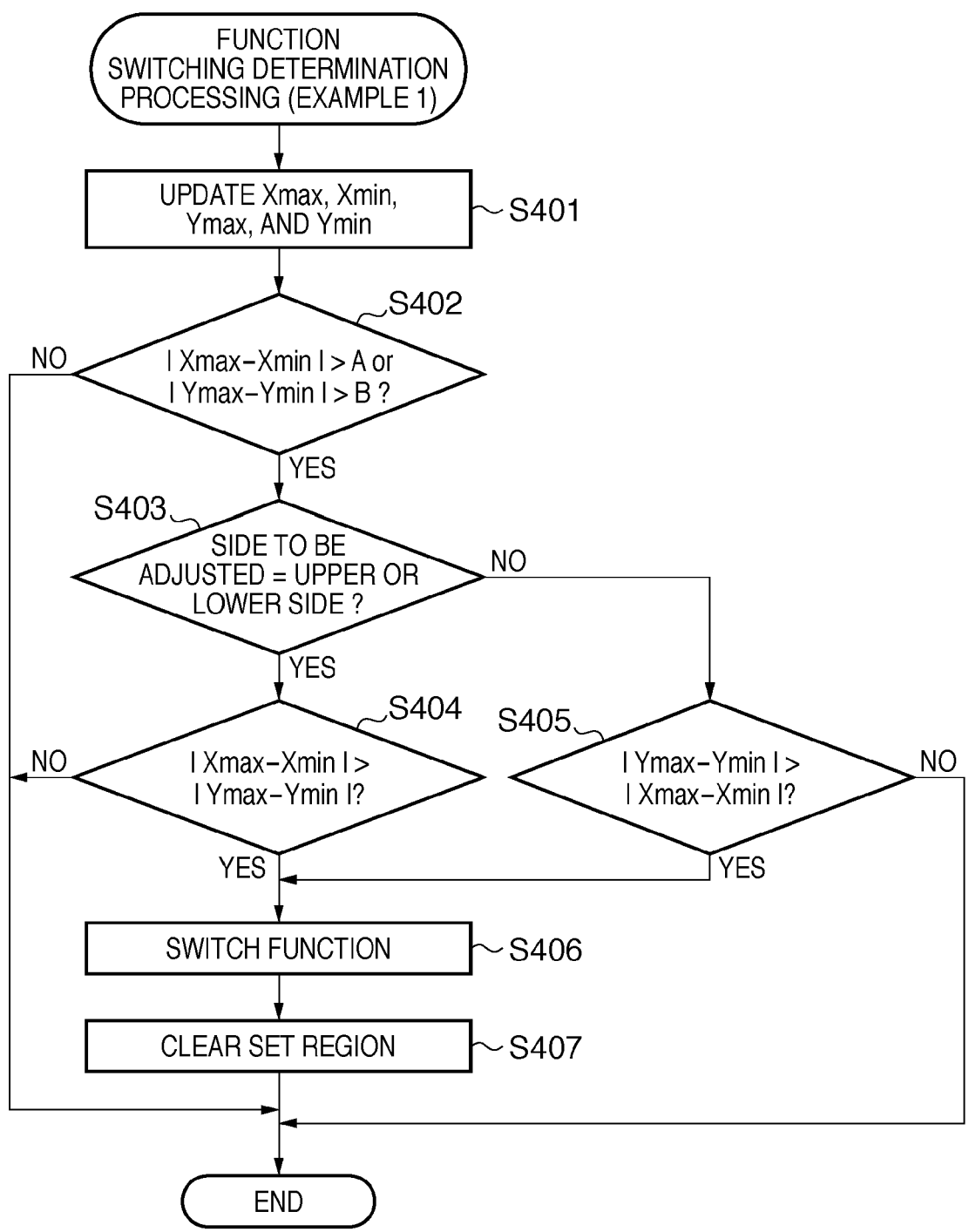
FIG. 4 is a flowchart showing an example of function switching determination processing in step S208 of FIG. 2.
Figure 5:
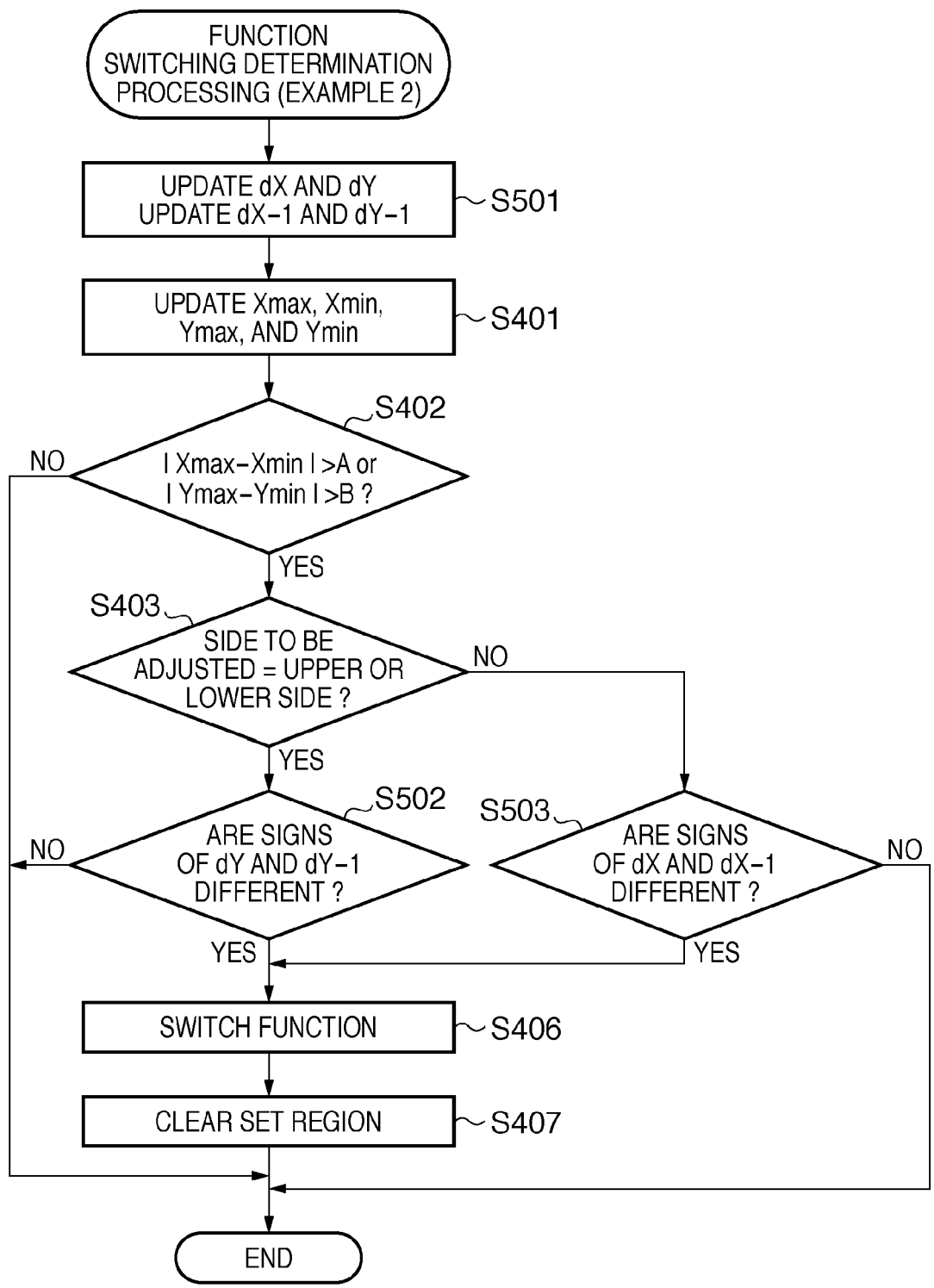
FIG. 5 is a flowchart showing another example of function switching determination processing in step S208 of FIG. 2.
Figure 6:
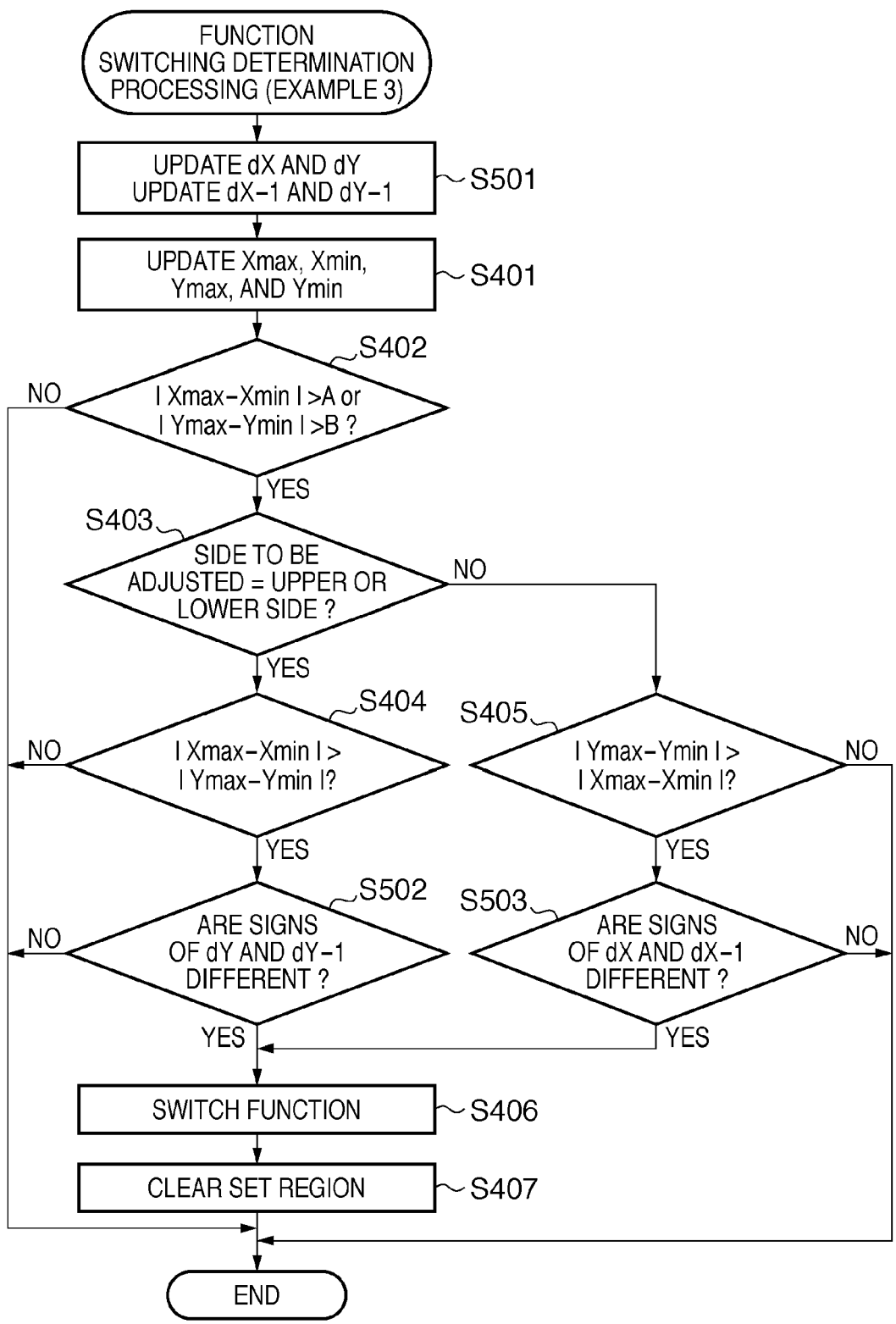
FIG. 6 is a flowchart showing still another example of function switching determination processing in step S208 of FIG. 2.

Function switching determination processing in step S208 of FIG. 2 will be exemplified with reference to FIGS. 4 to 6. FIG. 4 is a flowchart showing an example of function switching determination processing in step S208 of FIG. 2. In the example of FIG. 4, switching to region setting processing occurs when a component parallel to the side to be adjusted becomes larger than a component (that is, a moving trajectory component used in adjustment) perpendicular to the side to be adjusted in the moving trajectory of the current touch position by Move.

In step S401, when the current touch position changed by Move requires update of the maximum value Xmax and minimum value Xmin of the X-coordinate and the maximum value Ymax and minimum value Ymin of the Y-coordinate in Touch Down, the CPU 101 stores the updated values in the memory 103.

In step S402, the CPU 101 determines whether at least either of the following relations is established:

$$|Xmax - Xmin| > A \quad (1)$$

$$|Ymax - Ymin| > B \quad (2)$$

where A and B are preset thresholds. The determination in step S402 is a determination of whether Move has been done by a predetermined distance or more (that is, the touch position does not substantially stand still). If neither relation (1) nor (2) is established, it is considered that the touch position substantially stands still or movement of the touch position falls within the range of an error caused by shaking of the user hand or the like. Thus, the CPU 101 ends the process of the flowchart without switching the function. In contrast, if at least either relation (1) or (2) is established, it is considered that the touch position has substantially been moved, and the process advances to step S403.

In step S403, the CPU 101 determines whether the side to be adjusted that has been determined in step S205 of FIG. 2 is the upper or lower side of the set region 302. If the side to be adjusted is the upper or lower side of the set region 302, the process advances to step S404. If the side to be adjusted is neither the upper nor lower side of the set region 302 (that is, the side to be adjusted is the right or left side), the process advances to step S405.

Figure 3C:
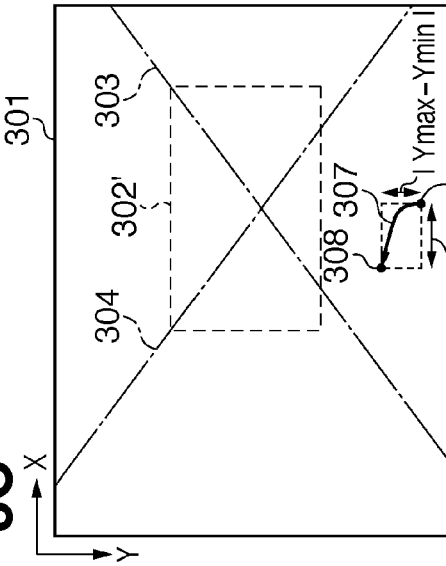

In step S404, the CPU 101 (setting control means) determines whether $$|Xmax - Xmin| > |Ymax - Ymin| \quad (3)$$

is established. If relation (3) is established, the process advances to step S406; if it is not established, the process of the flowchart ends without switching the function. The meaning of relation (3) will be explained with reference to FIG. 3C. In FIG. 3C, a point 308 indicates the current touch position. Relation (3) is used to determine whether a component (moving width of the X component) parallel to the side to be adjusted (upper or lower side) becomes larger than a component (moving width of the Y component) perpendicular to the side to be adjusted in a moving trajectory 307 of the current touch position by Move. If the user intends to adjust the side to be adjusted, it is considered that he mainly performs vertical Move serving as a component used in adjustment, that is, the Y component, and horizontal Move serving as the X component falls within the range of an error and does not exceed the Y component. Hence, when the moving amount of the X component exceeds that of the Y component during adjustment of the side, it is considered that the user does not perform a manipulation of adjusting the side, and the function of adjusting a side switches to the other function, that is, the function of setting a new region. In the example of FIG. 3C, the start coordinate point 305 resides in region 3, so the side to be adjusted is the lower side. Since the moving amount of the X component of the moving trajectory 307 exceeds that of the Y component, the CPU 101 determines that relation (3) is true. In this case, it is determined whether the moving amount of the X component exceeds that of the Y component. Instead, whether the moving width of the X component exceeds a predetermined threshold (|Xmax−Xmin|>threshold C) may be determined regardless of the moving amount of the Y component.

Processing in step S405 is the same as that in step S404 except that the X and Y components are exchanged. If the CPU 101 determines "true" in step S405, the process advances to step S406; if it determines "false", the process of the flowchart ends.

In step S406, the CPU 101 ends the side adjustment function (region adjustment processing) and switches it to the function of setting a new region. More specifically, the CPU 101 stores, in the memory 103, a switching flag indicating that the side adjustment function has ended and is switched to the function of setting a new region.

In step S407, the CPU 101 deletes the display of the set region 302 from the display 110, and clears the information which has been stored in the memory 103 and specifies the range of the set region 302 (cancels the region setting). After the end of this processing, the CPU 101 returns to step S209 of FIG. 2 to continue the process.

FIG. 5 is a flowchart showing another example of function switching determination processing in step S208 of FIG. 2. In the example of FIG. 5, switching to region setting processing occurs when the moving direction of a component perpendicular to the side to be adjusted (that is, a moving trajectory component used in adjustment) is reversed in the moving trajectory of the current touch position by Move. In FIG. 5, the same reference numerals as those in FIG. 4 denote the same or similar processes, and a description thereof will not be repeated.

In step S501, the CPU 101 acquires the current touch position. The CPU 101 updates a moving amount (dX, dY) from a previously acquired (sampled) touch position to the current touch position in the moving trajectory by Move. The CPU 101 also updates a moving amount (dX-1, dY-1) from a second previously acquired (sampled) touch position to a previously acquired touch position. The CPU 101 stores the updated values in the memory 103.

Figure 3D:
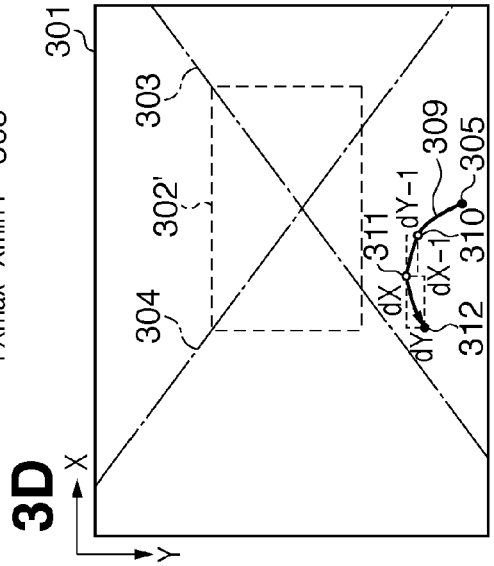

In step S502, the CPU 101 determines whether the signs of dY and dY-1 are different. If the signs are different (reversed), the process advances to step S406; if the signs are the same, ends. The meaning of the determination in step S502 will be described with reference to FIG. 3D. In FIG. 3D, a point 312 indicates the current touch position in a moving trajectory 309 of Move. A point 311 indicates a position (touch position in previous sampling) where the coordinate point of a previous touch position was acquired. A point 310 indicates a position (touch position in second previous sampling) where the coordinate point of a second previous touch position was acquired. (dX, dY) is a moving amount from the point 311 to the point 312, and (dX-1, dY-1) is that from the point 310 to the point 311. In the example of FIG. 3D, dY-1 indicates upward (negative Y direction) movement on the screen, and dY indicates downward (positive Y direction) movement on the screen. That is, the moving trajectory used in adjustment is turned back. In this case, it is considered that the user has ended the manipulation of moving up the lower side and does not intend to adjust the side position any more. Thus, the CPU 101 switches the function of adjusting a side to the other function (that is, region setting processing). In this case, the function is switched immediately when the moving direction of the Y component is turned back. Alternatively, it may be determined whether the touch position has moved by a predetermined threshold or more after turn-back in a direction in which the moving direction has been turned back.

Processing in step S503 is the same as that in step S502 except that the X and Y components are exchanged. If the CPU 101 determines "true" in step S503, the process advances to step S406; if it determines "false", ends.

FIG. 6 is a flowchart showing still another example of function switching determination processing in step S208 of FIG. 2. In FIG. 6, the same reference numerals as those in FIGS. 4 and 5 denote the same or similar processes, and a description thereof will not be repeated.

Processing of FIG. 6 is a combination of processes in FIGS. 4 and 5. More specifically, switching to region setting processing occurs when a moving component parallel to the side to be adjusted becomes larger than a moving component used in adjustment of the side in the moving trajectory of the current touch position by Move, and the moving component perpendicular to the side to be adjusted is turned back. With this setting, it can be determined that the user has drawn an almost arcuate trajectory. It can be more accurately determined that the user tries not to adjust a side but to set a new region.

As described above, according to the embodiment, when the moving trajectory of the touch position during Move satisfies a predetermined condition, switching from region adjustment processing to region setting processing occurs, and a new region is set. Therefore, a manipulation burden for adjusting a region set on the display screen, and a manipulation burden for setting a new region can be reduced with good balance.

Meanwhile, as the manipulation of adjusting a set region, the above-described embodiment has exemplified the manipulation of adjusting the position of the side of a set region. However, adjustment of a set region is not limited to this, and may be movement or rotation of a set region. It is also possible to, for example, move a set region in accordance with Move until the trajectory of Move does not satisfy a predetermined condition after Touch Down, and when the moving trajectory of Move satisfies it, set a new region. As another example of the manipulation of adjusting a set region, if no Move is done (no movement occurs) for a predetermined time after Touch Down, the function switches to rotation processing, and the rotation processing is executed in response to Move after a predetermined time. This manipulation may be executed in combination with the manipulation of adjusting a side in response to Move which has occurred before the lapse of the predetermined time, like the above-described embodiment. When a touched-down position falls inside the set region 302, the position of the set region 302 may be moved in accordance with subsequent Move. When a touched-down position falls outside the set region 302, the position of a specific side may be adjusted depending on which of regions 1 to 4 contains the touched-down position, as described with reference to FIG. 3A. In any case, if Move satisfies a predetermined condition, the set region is automatically deleted and a new region is created.

Figure 7:
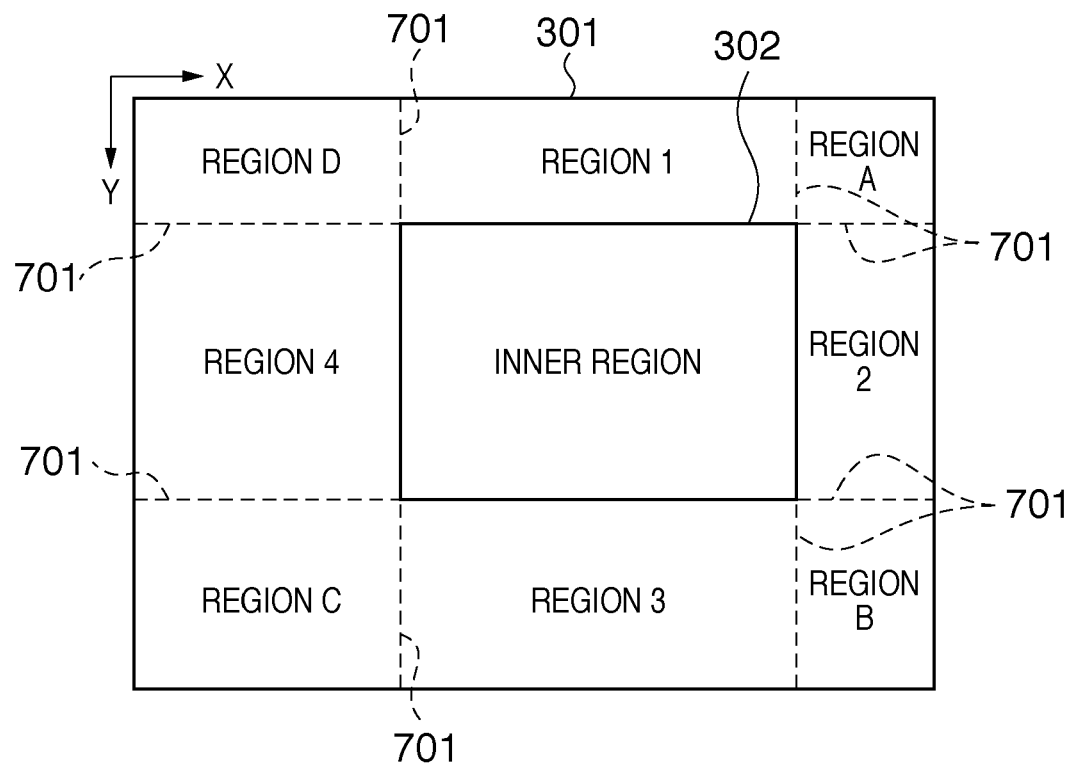
FIG. 7 is a view showing another example of a method of determining a side to be adjusted in step S205 of FIG. 2.

As for the method of determining the adjustment target of a set region, an example other than one in step S205 of FIG. 2 will be explained with reference to FIG. 7. In the display region 301, which is the entire display screen of the display 110, assume that the X- and Y-coordinates are positive in directions shown in FIG. 7 using the upper left corner of the display region 301 as the origin. The set region 302 is displayed in the display region 301. In this case, the four sides of the set region 302 and extensions 701 of them divide the display region 301 into regions 1 to 4, regions A to D, and an inner region (of the set region 302) shown in FIG. 7. Depending on which region contains the start coordinate point (X0, Y0) acquired in step S202, the CPU 101 determines a portion of the set region 302 and how to adjust the portion.

When the start coordinate point (X0, Y0) resides in, out of the divided regions, a region (one of regions 1 to 4) which is adjacent to the inner region via the side of the set region 302, the side sandwiched between the region containing the start coordinate point (X0, Y0) and the inner region is determined as the adjustment target, and the side to be adjusted is adjusted in accordance with subsequent Move. More specifically, the adjustment target is the upper side when the start coordinate point (X0, Y0) resides in region 1, the right side when it resides in region 2, the lower side when it resides in region 3, and the left side when it resides in region 4.

When the start coordinate point (X0, Y0) resides in, out of the divided regions, a region (one of regions A to D) which is outside the inner region and is not adjacent to it via the side of the set region 302, the entire set region 302 is determined as the adjustment target, and the angle of the inner region is adjusted in accordance with subsequent Move. For example, the set region is rotated in accordance with Move using, as the center, the intersection point of the diagonals of the set region 302 or the barycenter of the set region 302.

When the start coordinate point (X0, Y0) resides in the inner region of the set region 302 out of the divided regions, the entire set region 302 is determined as the adjustment target and moved in accordance with subsequent Move.

As for adjustment of a side, rotation of a region, and movement of a region, when the moving amount of the side position, the amount of rotation, and the amount of region movement (these amounts will be generically called adjustment amounts) are set equal to the amount of Move, this implements an intuitive manipulation for the user, similar to the example described with reference to FIG. 3B. When the adjustment amounts are set smaller than the amount of Move, fine adjustment becomes possible even by a rough user manipulation. When the adjustment amounts are set larger than the amount of Move, large adjustment becomes possible even by a slight user manipulation. As a result, the user can quickly, reliably adjust the set region 302 by a rough manipulation without a fine adjustment for a larger number of adjustment items.

As described above, the PD can be not the touch panel but the mouse. In this case, it suffices to replace Touch Down with a click manipulation with the mouse, Move with a manipulation (dragging) of moving the mouse while keeping clicking it, and Touch Up with a manipulation of canceling clicking finally after dragging. Also when another PD is used, it suffices to replace the foregoing manipulations with ones corresponding to the PD properties.

As will be described below, the present invention can also be implemented as a computer-readable recording medium and a program recorded on it.

[Other Embodiment]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-259308, filed on Nov. 12, 2009, which is hereby incorporated by reference herein in its entirety.

What is claimed is:

1. A display control apparatus comprising:
    an input unit configured to designate a position on a display screen;
    a display control unit configured to control to identifiably display a set region set on the display screen; and
    a control unit configured to control to, when a trajectory of the designated position after a start of designating the position by said input unit does not satisfy a predetermined condition while the set region is set on the display screen, change a portion occupied by the set region on the display screen in accordance with the trajectory, and when the trajectory satisfies the predetermined condition, set a new set region different from the set region on the display screen in accordance with the trajectory,
    wherein the change includes at least one of movement of a specific side of the set region, movement of the set region, rotation of the set region, enlargement of the set region, and reduction of the set region, and
    wherein the predetermined condition is that a component of the trajectory that is parallel to the specific side moved by the change becomes larger than a component perpendicular to the specific side.

2. The apparatus according to claim 1, wherein the specific side is specified based on the position designated on the display screen by said input unit, even if a position of a side of the set region is not designated by said input unit.

3. The apparatus according to claim 2, wherein the specific side is specified based on which of regions obtained by dividing the display screen by diagonals of the set region contains the position designated on the display screen by said input unit.

4. The apparatus according to claim 2, wherein the specific side is specified based on a position designated at the start of designating the position by said input unit.

5. The apparatus according to claim 1, wherein a moving amount of movement of the specific side by the change is smaller or larger than a moving amount of the trajectory.

6. The apparatus according to claim 1, wherein when the trajectory satisfies the predetermined condition, said control unit controls to delete the set region.

7. The apparatus according to claim 1, wherein said control unit sets, as the new set region, a rectangular region which circumscribes the trajectory.

8. The apparatus according to claim 1, wherein said control unit sets, as the new set region, a rectangular region whose diagonal is defined by a start point and end point of the trajectory.

9. The apparatus according to claim 1, further comprising a processing unit configured to perform, based on the set region, at least one processing among trimming of an image, enlargement of an image, and setting of a window.

10. The apparatus according to claim 1, wherein the set region is a quadrangle.

11. The apparatus according to claim 1, wherein said input unit is one of a touch panel and a mouse.

12. A method of controlling a display control apparatus having an input unit configured to designate a position on a display screen, the method comprising:
    a display control step of controlling to identifiably display a set region set on the display screen; and
    a control step of controlling to, when a trajectory of the designated position after a start of designating the position by the input unit does not satisfy a predetermined condition while the set region is set on the display screen, change a portion occupied by the set region on the display screen in accordance with the trajectory, and when the trajectory satisfies the predetermined condition, set a new set region different from the set region on the display screen in accordance with the trajectory,
    wherein the change includes at least one of movement of a specific side of the set region, movement of the set region, rotation of the set region, enlargement of the set region, and reduction of the set region, and
    wherein the predetermined condition is that a component of the trajectory that is parallel to the specific side moved by the change becomes larger than a component perpendicular to the specific side.

13. A non-transitory computer readable storage medium recording a program for causing a computer having an input unit configured to designate a position on a display screen, to function as
    a display control unit configured to control to identifiably display a set region set on the display screen, and
    a control unit configured to control to, when a trajectory of the designated position after a start of designating the position by the input unit does not satisfy a predetermined condition while the set region is set on the display screen, change a portion occupied by the set region on the display screen in accordance with the trajectory, and when the trajectory satisfies the predetermined condition, set a new set region different from the set region on the display screen in accordance with the trajectory,
    wherein the change includes at least one of movement of a specific side of the set region, movement of the set region, rotation of the set region, enlargement of the set region, and reduction of the set region, and
    wherein the predetermined condition is that a component of the trajectory that is parallel to the specific side moved by the change becomes larger than a component perpendicular to the specific side.

14. A display control apparatus comprising:
    an input unit configured to designate a position on a display screen;
    a display control unit configured to control to identifiably display a set region set on the display screen; and
    a control unit configured to control to, when a trajectory of the designated position after a start of designating the position by said input unit does not satisfy a predetermined condition while the set region is set on the display screen, change a portion occupied by the set region on the display screen in accordance with the trajectory, and when the trajectory satisfies the predetermined condition, set a new set region different from the set region on the display screen in accordance with the trajectory, wherein the change includes at least one of movement of a specific side of the set region, movement of the set region, rotation of the set region, enlargement of the set region, and reduction of the set region, and wherein the predetermined condition is that a moving direction of a component of the trajectory that is perpendicular to the specific side moved by the change is reversed.

15. The apparatus according to claim 14, wherein the specific side is specified based on the position designated on the display screen by said input unit, even if a position of a side of the set region is not designated by said input unit.

16. The apparatus according to claim 15, wherein the specific side is specified based on which of regions obtained by dividing the display screen by diagonals of the set region contains the position designated on the display screen by said input unit.

17. The apparatus according to claim 15, wherein the specific side is specified based on a position designated at the start of designating the position by said input unit.

18. The apparatus according to claim 14, wherein a moving amount of movement of the specific side by the change is smaller or larger than a moving amount of the trajectory.

19. The apparatus according to claim 14, wherein when the trajectory satisfies the predetermined condition, said control unit controls to delete the set region.

20. The apparatus according to claim 14, wherein said control unit sets, as the new set region, a rectangular region which circumscribes the trajectory.

21. The apparatus according to claim 14, wherein said control unit sets, as the new set region, a rectangular region whose diagonal is defined by a start point and end point of the trajectory.

22. The apparatus according to claim 14, further comprising a processing unit configured to perform, based on the set region, at least one processing among trimming of an image, enlargement of an image, and setting of a window.

23. The apparatus according to claim 14, wherein the set region is a quadrangle.

24. The apparatus according to claim 14, wherein said input unit is one of a touch panel and a mouse.

25. A method of controlling a display control apparatus having an input unit configured to designate a position on a display screen, the method comprising:

a display control step of controlling to identifiably display a set region set on the display screen; and a control step of controlling to, when a trajectory of the designated position after a start of designating the position by the input unit does not satisfy a predetermined condition while the set region is set on the display screen, change a portion occupied by the set region on the display screen in accordance with the trajectory, and when the trajectory satisfies the predetermined condition, set a new set region different from the set region on the display screen in accordance with the trajectory, wherein the change includes at least one of movement of a specific side of the set region, movement of the set region, rotation of the set region, enlargement of the set region, and reduction of the set region, and wherein the predetermined condition is that a moving direction of a component of the trajectory that is perpendicular to the specific side moved by the change is reversed.

26. A non-transitory computer readable storage medium recording a program for causing a computer having an input unit configured to designate a position on a display screen, to function as a display control unit configured to control to identifiably display a set region set on the display screen, and a control unit configured to control to, when a trajectory of the designated position after a start of designating the position by the input unit does not satisfy a predetermined condition while the set region is set on the display screen, change a portion occupied by the set region on the display screen in accordance with the trajectory, and when the trajectory satisfies the predetermined condition, set a new set region different from the set region on the display screen in accordance with the trajectory, wherein the change includes at least one of movement of a specific side of the set region, movement of the set region, rotation of the set region, enlargement of the set region, and reduction of the set region, and wherein the predetermined condition is that a moving direction of a component of the trajectory that is perpendicular to the specific side moved by the change is reversed.

27. A display control apparatus comprising:

an input unit configured to designate a position on a display screen;

a display control unit configured to control to identifiably display a set region set on the display screen; and a control unit configured to control to, when a trajectory of the designated position after a start of designating the position by said input unit does not satisfy a predetermined condition while the set region is set on the display screen, change a portion occupied by the set region on the display screen in accordance with the trajectory, and when the trajectory satisfies the predetermined condition, set a new set region different from the set region on the display screen in accordance with the trajectory, wherein the change includes at least one of movement of a specific side of the set region, movement of the set region, rotation of the set region, enlargement of the set region, and reduction of the set region, and wherein the predetermined condition is that a component of the trajectory that is parallel to the specific side moved by the change becomes larger than a component perpendicular to the specific side, and a moving direction of the component of the trajectory that is perpendicular to the specific side moved by the change is reversed.

28. The apparatus according to claim 27, wherein the specific side is specified based on the position designated on the display screen by said input unit, even if a position of a side of the set region is not designated by said input unit.

29. The apparatus according to claim 28, wherein the specific side is specified based on which of regions obtained by dividing the display screen by diagonals of the set region contains the position designated on the display screen by said input unit.

30. The apparatus according to claim 28, wherein the specific side is specified based on a position designated at the start of designating the position by said input unit.

31. The apparatus according to claim 27, wherein a moving amount of movement of the specific side by the change is smaller or larger than a moving amount of the trajectory.

32. The apparatus according to claim 27, wherein when the trajectory satisfies the predetermined condition, said control unit controls to delete the set region.

33. The apparatus according to claim 27, wherein said control unit sets, as the new set region, a rectangular region which circumscribes the trajectory.

34. The apparatus according to claim 27, wherein said control unit sets, as the new set region, a rectangular region whose diagonal is defined by a start point and end point of the trajectory.

35. The apparatus according to claim 27, further comprising a processing unit configured to perform, based on the set region, at least one processing among trimming of an image, enlargement of an image, and setting of a window.

36. The apparatus according to claim 27, wherein the set region is a quadrangle.

37. The apparatus according to claim 27, wherein said input unit is one of a touch panel and a mouse.

38. A method of controlling a display control apparatus having an input unit configured to designate a position on a display screen, the method comprising:

a display control step of controlling to identifiably display a set region set on the display screen; and a control step of controlling to, when a trajectory of the designated position after a start of designating the position by the input unit does not satisfy a predetermined condition while the set region is set on the display screen, change a portion occupied by the set region on the display screen in accordance with the trajectory, and when the trajectory satisfies the predetermined condition, set a new set region different from the set region on the display screen in accordance with the trajectory, wherein the change includes at least one of movement of a specific side of the set region, movement of the set region, rotation of the set region, enlargement of the set region, and reduction of the set region, and wherein the predetermined condition is that a component of the trajectory that is parallel to the specific side moved by the change becomes larger than a component perpendicular to the specific side, and a moving direction of the component of the trajectory that is perpendicular to the specific side moved by the change is reversed.

39. A non-transitory computer readable storage medium recording a program for causing a computer having an input unit configured to designate a position on a display screen, to function as a display control unit configured to control to identifiably display a set region set on the display screen, and a control unit configured to control to, when a trajectory of the designated position after a start of designating the position by the input unit does not satisfy a predetermined condition while the set region is set on the display screen, change a portion occupied by the set region on the display screen in accordance with the trajectory, and when the trajectory satisfies the predetermined condition, set a new set region different from the set region on the display screen in accordance with the trajectory, wherein the change includes at least one of movement of a specific side of the set region, movement of the set region, rotation of the set region, enlargement of the set region, and reduction of the set region, and wherein the predetermined condition is that a component of the trajectory that is parallel to the specific side moved by the change becomes larger than a component perpendicular to the specific side, and a moving direction of the component of the trajectory that is perpendicular to the specific side moved by the change is reversed.

* * * * *